United States Patent
Chen et al.

(10) Patent No.: US 11,619,830 B1
(45) Date of Patent: Apr. 4, 2023

(54) DISPLAY WITH A TIME-SEQUENTIAL DIRECTIONAL BACKLIGHT

(71) Applicant: Apple Inc., Cupertino, CA (US)

(72) Inventors: Hao Chen, Santa Clara, CA (US); Juan He, San Jose, CA (US); Rong Liu, Sunnyvale, CA (US); ByoungSuk Kim, Palo Alto, CA (US); Jun Qi, San Jose, CA (US); Yi Huang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/705,073

(22) Filed: Mar. 25, 2022

Related U.S. Application Data

(60) Provisional application No. 63/217,999, filed on Jul. 2, 2021.

(51) Int. Cl.
  *G02B 30/33* (2020.01)
  *G02F 1/137* (2006.01)
  *G02F 1/13357* (2006.01)
  *G02F 1/1335* (2006.01)
  *G02B 30/27* (2020.01)

(52) U.S. Cl.
  CPC ............. *G02B 30/33* (2020.01); *G02B 30/27* (2020.01); *G02F 1/137* (2013.01); *G02F 1/133605* (2013.01); *G02F 1/133607* (2021.01); *G02F 1/133613* (2021.01)

(58) Field of Classification Search
  CPC ... G02B 30/33; G02B 30/27; G02F 1/133605; G02F 1/133607
  USPC .......................................................... 349/15
  See application file for complete search history.

(56) References Cited

U.S. PATENT DOCUMENTS

| | | | |
|---|---|---|---|
| 8,545,075 B2 * | 10/2013 | Park | G02F 1/133603 362/555 |
| 11,067,736 B2 | 7/2021 | Robinson et al. | |
| 11,227,556 B1 * | 1/2022 | Kim | G09G 3/3648 |

(Continued)

OTHER PUBLICATIONS

Yong Seok Hwang et al., Time-sequential autostereoscopic 3-D display with a novel directional backlight system based on volume-holographic optical elements, Optics Express, Apr. 21, 2014, pp. 9820-9838, vol. 22, No. 8, Optica, Washington, DC, United States.

*Primary Examiner* — Charles S Chang
(74) *Attorney, Agent, or Firm* — Treyz Law Group, P.C.; Joseph F. Guihan

(57) ABSTRACT

To enable a display to display different content to different viewers, a display may include a time-sequential directional backlight unit. The backlight unit may emit light in different directions in different configurations. In a first state, the backlight unit emits light at maximum brightness in a first direction. In a second state, the backlight unit emits light at maximum brightness in a second direction that is different than the first direction. The backlight unit may repeatedly and rapidly switch between the different states. The first direction may be towards a first viewer whereas the second direction may be towards a second, different viewer. Therefore, each viewer receives backlight in one of the configurations and does not receive backlight in the other configuration. In synchronization with the backlight unit, the liquid crystal display panel may repeatedly switch between displaying content for the first viewer and displaying content for the second viewer.

19 Claims, 11 Drawing Sheets

(56) References Cited

U.S. PATENT DOCUMENTS

| | | | |
|---|---|---|---|
| 2011/0187635 A1* | 8/2011 | Lee | G09G 3/36 |
| | | | 345/102 |
| 2013/0328866 A1 | 12/2013 | Woodgate et al. | |
| 2016/0223824 A1 | 8/2016 | Robinson | |
| 2016/0249044 A1* | 8/2016 | Yang | H04N 13/376 |
| 2016/0349524 A1 | 12/2016 | Pijlman et al. | |
| 2021/0223462 A1 | 7/2021 | Liu et al. | |

\* cited by examiner

DISPLAY WITH A TIME-SEQUENTIAL DIRECTIONAL BACKLIGHT

This application claims the benefit of U.S. provisional patent application No. 63/217,999, filed Jul. 2, 2021, which is hereby incorporated by reference herein in its entirety.

FIELD

This relates generally to electronic devices, and, more particularly, to electronic devices with displays.

BACKGROUND

Electronic devices often include displays. In some cases, displays may present different content to different viewers. However, displays that present different content to different viewers may have lower than desired efficiency, lower than desired viewing angle, and/or visible artifacts such as ghost images.

SUMMARY

An electronic device may include a display. The display may include a liquid crystal display panel and a backlight unit. In some cases, it may be desirable to use the display to display different content to different viewers (e.g., a first viewer of the display perceives a first image and a second viewer of the display perceives a second, entirely different image).

To enable the display to display different content to different viewers, the backlight unit may be a time-sequential directional backlight unit. The backlight unit may be capable of emitting light in different directions in different configurations. In a first state, the backlight unit emits light at maximum brightness in a first direction. In a second state, the backlight unit emits light at maximum brightness in a second direction that is different than the first direction. The backlight unit may repeatedly and rapidly switch between the different states.

As an example, the first direction may be towards a first viewer (e.g., a first viewing area) whereas the second direction may be towards a second, different viewer (e.g., a second viewing area). Therefore, each viewer receives backlight in one of the configurations and does not receive backlight in the other configuration. In synchronization with the backlight unit, the liquid crystal display panel may repeatedly switch between displaying content for the first viewer and displaying content for the second viewer.

The backlight unit may include a first group of light sources and a second group of light sources. The first group of light sources may be turned on in the first state while the second group of light sources may be turned off in the first state. The second group of light sources may be turned on in the second state while the first group of light sources may be turned off in the second state. Reflective structures may be included between adjacent light sources to prevent crosstalk. A light directing layer may be interposed between the light sources and the display panel. A lenticular lens film may be formed over the display panel to enable stereoscopic viewing.

DETAILED DESCRIPTION

Figure 1:
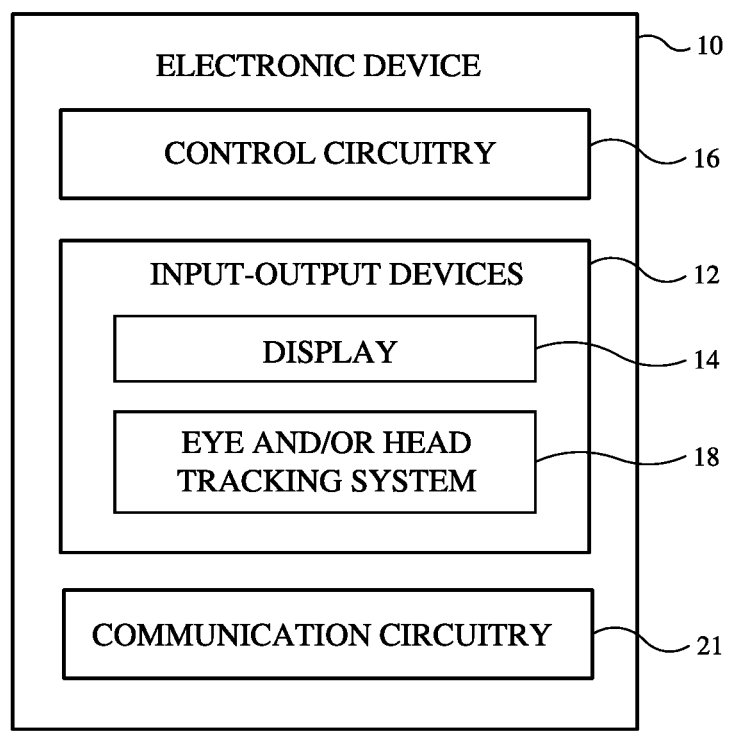
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is a liquid crystal display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of eye and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene. Eye and/or head tracking system may include a light detection and ranging (lidar) sensor, a time-of-flight (ToF) sensor, an accelerometer (e.g., to detect the orientation of electronic device 10), a camera, or a combination of two or more of these components. Including sensors such as a light detection and ranging (lidar) sensor, a time-of-flight (ToF) sensor, or an accelerometer may improve acquisition speeds when tracking eye/head position of the viewer.

Figure 2:
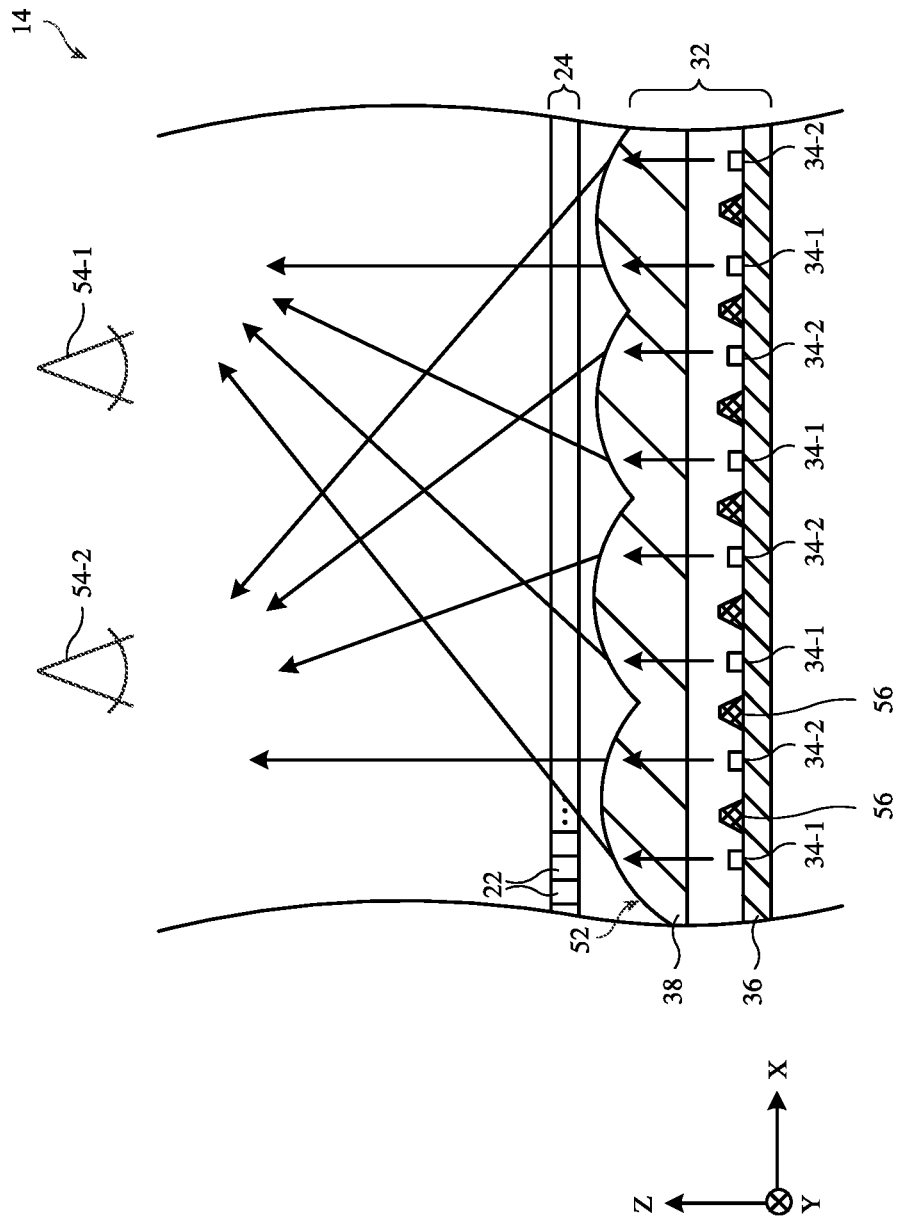
FIG. 2 is a cross-sectional side view of an illustrative display with a time-sequential directional backlight that emits backlight in two different directions in accordance with an embodiment.

FIG. 2 is a cross-sectional side view of an illustrative display that includes a time-sequential directional backlight. As shown, the display may include a display panel 24 that has an array of pixels 22. Display panel 24 may be, for example, a liquid crystal display panel. The liquid crystal display panel may include components such as a lower polarizer, a thin-film transistor substrate that is configured to control each pixel, a liquid crystal layer that is controlled by the thin-film transistor substrate, a color filter substrate with a plurality of color filters, and an upper polarizer. The liquid crystal display panel may receive backlight from a backlight unit such as backlight unit 32. Thin-film transistor circuitry on the thin-film transistor substrate may control the transmission of the backlight through each pixel in the display, thereby controlling the brightness of each pixel.

Backlight unit 32 may be a time-sequential directional backlight. Accordingly, backlight unit 32 is capable of emitting light in different directions in different configurations (e.g., emitting light at maximum brightness in a first direction in a first configuration and emitting light at maximum brightness in a second direction in a second configuration). The backlight unit 32 may rapidly switch between the different configurations. As an example, the first direction may be towards a first viewer (e.g., a first viewing area) whereas the second direction may be towards a second, different viewer (e.g., a second viewing area). Therefore, each viewer receives backlight in one of the configurations and does not receive backlight in the other configuration.

Backlight 32 includes a plurality of light sources 34. The light sources may be light-emitting diodes (LEDs), as one example. The LEDs (e.g., LED packages) may be mounted to underlying substrate 36. Substrate 36 may be a printed circuit board or a substrate of any other desired material (e.g., glass, silicon, plastic, etc.). The light sources may be crystalline semiconductor light-emitting diode dies (mini-LEDs or micro-LEDs), organic light-emitting diodes (OLEDs), or any other desired type of light source.

Light sources 34 in backlight unit 32 may be covered by a light directing layer 38. Light directing layer 38 may direct light from some of the light sources to a first viewer and may direct light from some of the light sources to a second viewer. In the example of FIG. 2, the light directing layer includes a plurality of lenticular lenses 52. Each lenticular lens may extend along the Y-axis (into and out of the page). As shown in FIG. 2, there is a first set of light sources 34-1 in backlight unit 32. Each one of the light sources 34-1 is positioned under the left half of a respective lenticular lens. There is also a second set of light sources 34-2 in backlight unit 32. Each one of the light sources 34-2 is positioned under the right half of a respective lenticular lens.

As shown in FIG. 2, each one of the first set of light sources emits light that is redirected by light directing layer 38 towards a first viewer 54-1. Each one of the second set of light sources, meanwhile, emits light that is redirected by light directing layer 38 towards a second viewer 54-2.

To display an image for only viewer 54-1 and not viewer 54-2, the first set of light sources 34-1 may be turned on while the second set of light sources 34-2 are turned off. In this configuration, only the first viewer 54-1 will receive the backlight from backlight unit 32 (and accordingly, only the first viewer 54-1 will be able to see images on display panel 24). To display an image for only viewer 54-2 and not viewer 54-1, the second set of light sources 34-2 may be turned on while the first set of light sources 34-1 are turned off. In this configuration, only the second viewer 54-2 will receive the backlight from backlight unit 32 (and accordingly, only second viewer 54-1 will be able to see images on display panel 24). To display a common image that is simultaneously viewable by both viewer 54-1 and 54-2, both light sources 54-1 and light sources 54-2 may be turned on at the same time.

In addition to light sources 34-1 and 34-2, light guiding structures 56 may be mounted on an upper surface of substrate 36. Light guiding structures 56 are opaque or reflective structures that prevent crosstalk between the first set of light sources 34-1 and the second set of light sources 34-2. To maximize efficiency, the light guiding structures 56 may be reflective (e.g., white or metal structures having a high reflectivity). The light guiding structures may have a reflectivity that is greater than 50%, greater than 70%, greater than 80%, greater than 90%, greater than 95%, etc. The shape of the light guiding structures may be selected to ensure the reflected light travels in the desired direction (e.g., towards viewer 54-1 for light sources 34-1 and towards viewer 54-2 for light sources 34-2). As one example, shown in FIG. 2, the light guiding structures have first and second angled sidewalls that are angled away from the light sources.

Figure 3:
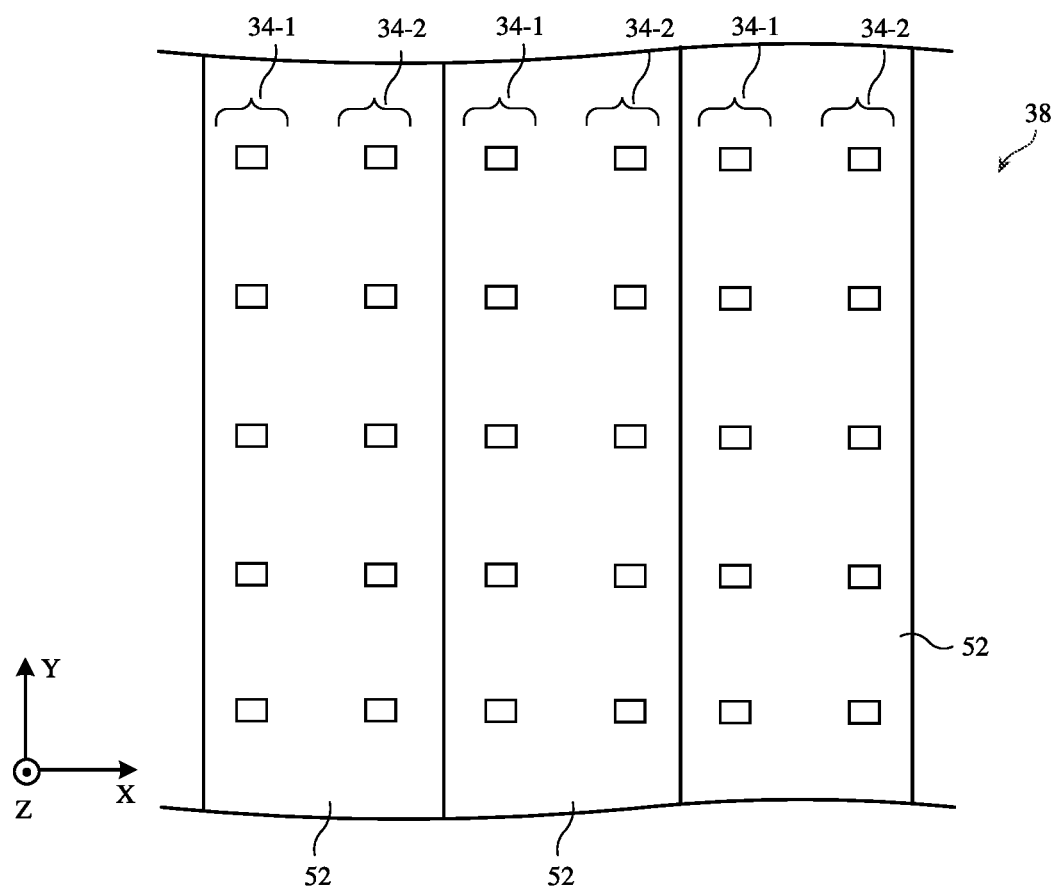
FIG. 3 is a top view of an illustrative light directing layer in a time-sequential directional backlight showing how different groups of light sources are arranged relative to the light directing layer in accordance with an embodiment.

FIG. 3 is a top view of an illustrative display showing how each set of light sources is positioned under respective portions of the lenticular lenses 52 in light directing layer 38. As shown in FIG. 3, light directing layer 38 includes a plurality of lenticular lenses 52. Each lenticular lens 52 may have a curved surface (e.g., a convex curved upper surface as in FIG. 2). Each lenticular lens extends in the Y-direction across the backlight unit. Each lenticular lens covers first and second sets of light sources that are arranged in strips that are parallel to the lenticular lens. The first set 34-1 is under a first half of the lenticular lens whereas the second set 34-2 is under a second half of the lenticular lens. Each set 34-1 of light sources is in the same relative position under each lenticular lens (e.g., under the left half of each lenticular lens when viewed from above as in FIG. 3). Each set 34-2 of light sources is in the same relative position under each lenticular lens (e.g., under the right half of each lenticular lens when viewed from above as in FIG. 3). This causes light from all of sets 34-1 to be directed in the same direction (e.g., towards the first viewer) and causes light from all of sets 34-2 to be directed in the same direction (e.g., towards the second viewer).

It should be understood that the direction of the light may refer to the primary direction of the emitted light (e.g., the direction of emitted light that has a maximum brightness, sometimes referred to as the chief ray angle).

Figure 4:
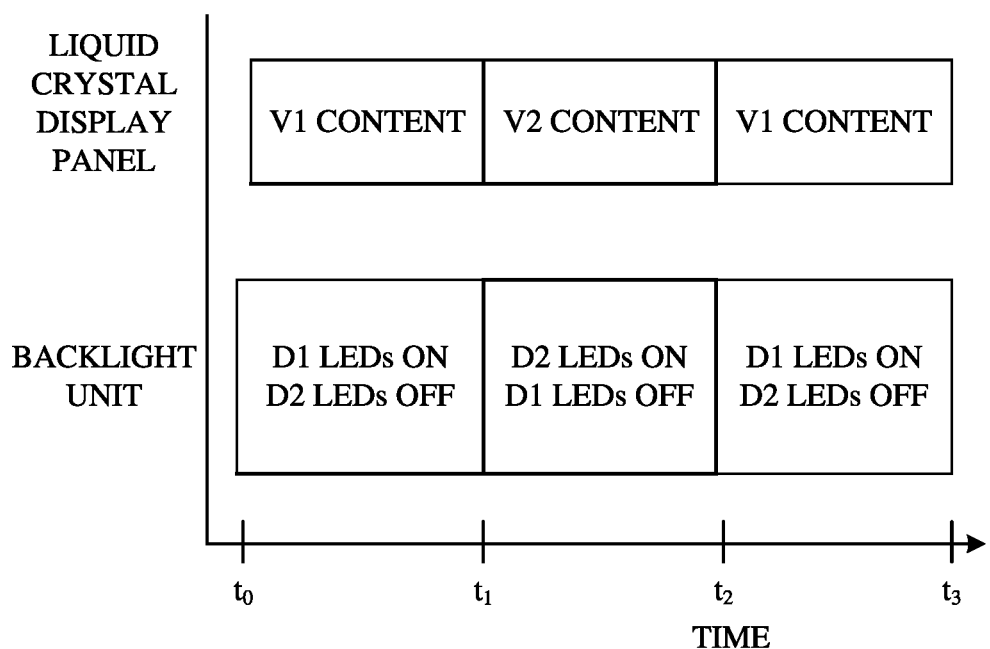
FIG. 4 is a timeline showing an illustrative mode of operation for a display with a time-sequential directional backlight in accordance with an embodiment.

FIG. 4 is a timeline showing the function of display 14 with a time-sequential directional backlight over time. As shown in FIG. 4, at $t_0$, the first set of light sources (e.g., LEDs 34-1 that emit light in a first direction D1) are turned on while the second set of light sources (e.g., LEDs 34-2 that emit light in a second direction D2) are turned off. This causes backlight to be emitted only in direction D1 (towards a first viewer V1) and not direction D2 (towards a second viewer V2). Also at $t_0$, the liquid crystal display panel is updated to display content for the first viewer V1. Each pixel 22 in liquid crystal display panel 24 may be refreshed to a brightness value associated with content for V1. Between $t_0$ and $t_1$, the second viewer V2 does not receive any light (e.g., the display will appear black/blank).

At $t_1$, the second set of light sources (e.g., LEDs 34-2 that emit light in a second direction D1) are turned on while the first set of light sources (e.g., LEDs 34-1 that emit light in a first direction D1) are turned off. This causes backlight to be emitted only in direction D2 (towards a second viewer V2) and not direction D1 (towards a second viewer V1). Also at $t_1$, the liquid crystal display panel is updated to display content for the second viewer V2. Each pixel 22 in liquid crystal display panel 24 may be refreshed to a brightness value associated with content for V2. Between $t_1$ and $t_2$, the first viewer V1 does not receive any light (e.g., the display will appear black/blank).

This pattern may be repeated, with the liquid crystal display panel alternating between displaying content for the first viewer and content for the second viewer. In synchronization with the liquid crystal display panel, the backlight unit alternates between emitting backlight in a first direction (towards the first viewer) and a second direction (towards the second viewer).

The interval (e.g., $t_1$-$t_0$, $t_2$-$t_1$, $t_3$-$t_2$) between displaying content for the first viewer and displaying content for the second viewer (e.g., the refresh rate of the liquid crystal display panel) may be constant or variable. This length of time may be 33.3 milliseconds (30 Hz), 16.7 milliseconds (60 Hz), 8.3 milliseconds (120 Hz), 4.2 milliseconds (240 Hz), between 2 milliseconds and 20 milliseconds, between 4 milliseconds and 18 milliseconds, between 4 milliseconds and 10 milliseconds, less than 40 milliseconds, less than 20 milliseconds, less than 10 milliseconds, etc. The interval (e.g., $t_2$-$t_0$, $t_3$-$t_1$) between each type of content being displayed (e.g., the refresh rate of the content perceived by the first viewer or the second viewer) may be constant or variable.

Because the liquid crystal display panel alternates between displaying content for the first viewer and content for the second viewer, the refresh rate of the content for the first viewer (and the second viewer) is half of the total refresh rate for the liquid crystal display panel (e.g., $RR_{V1}=RR_T/V$, where $RR_{V1}$ is the refresh rate for the first viewer, $RR_T$ is the total maximum refresh rate for the liquid crystal display panel, and V is the number of viewing areas provided by the display). In this example, the display provides different content to two different viewing areas (e.g., V=2). However, the display may instead provide content to three different viewing areas, four different viewing areas, more than four different viewing areas, etc.

The illustrative operation of FIG. 4 is merely illustrative. Instead of rapidly alternating between displaying content for the first viewer and displaying content for the second viewer, the display may instead sometimes display content for both viewers. For example, both sets of light sources in the directional backlight may be turned on and a common image may be displayed to both viewing areas. Then, one of the sets of light sources may be turned off and a different image may be displayed to only one of the viewing areas. This may allow two viewers to view a common image, with only one of the viewers also viewing additional content that is kept private from the second viewer.

As another example of operation of the display, eye and/or head tracking system 18 may detect whether or not the viewing areas of the display are occupied. If one of the viewing areas (e.g., the second viewing area) is not occupied, the light sources that direct light to that viewing area may be left off throughout display operation to conserve power. Once eye and/or head tracking system 18 detect a viewer in that viewing area, the light sources that direct light to that viewing area may be turned on and off per the timeline of FIG. 4.

Performance of display 14 may be improved when liquid crystal display panel 24 has a high refresh rate. To achieve a high refresh rate, liquid crystal display panel 24 may be a twisted nematic (TN) liquid crystal display panel, an active matrix liquid crystal display panel, an in-plane switching liquid crystal display panel, etc. Other techniques such as reducing the viscosity of the liquid crystal layer, reducing the size of the cell gap in the panel, and using an overdrive circuit to increase electric field may be used in the display panel to maximize refresh rate.

Figure 5A:
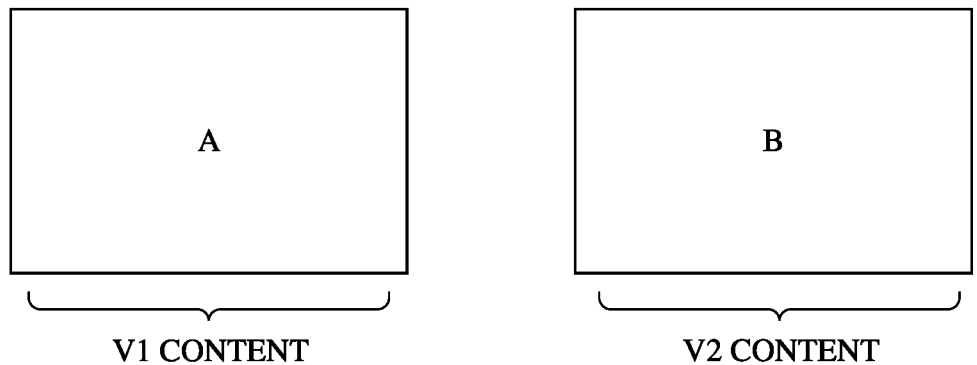
FIG. 5A is a top view showing how a display with a time-sequential directional backlight may present different content in different viewing areas in accordance with an embodiment.

FIG. 5A is a view of the content that may be presented to the first viewer and the second viewer. The first viewer may be presented with first content (e.g., content A) in a first viewing area while the second viewer is presented with second content (e.g., content B) in a second, different viewing area. The second content may be entirely different than the first content. For example, a first video may be displayed for the first viewer while a second, different video is displayed for the second viewer. Alternatively, a first user-interface (e.g., a navigation user-interface) may be displayed for the first viewer while a second, different user-interface (an entertainment system user-interface) is displayed for the second viewer. As yet another example, a first application may be displayed for the first viewer while a second, different application is displayed for the second viewer.

Figure 5B:
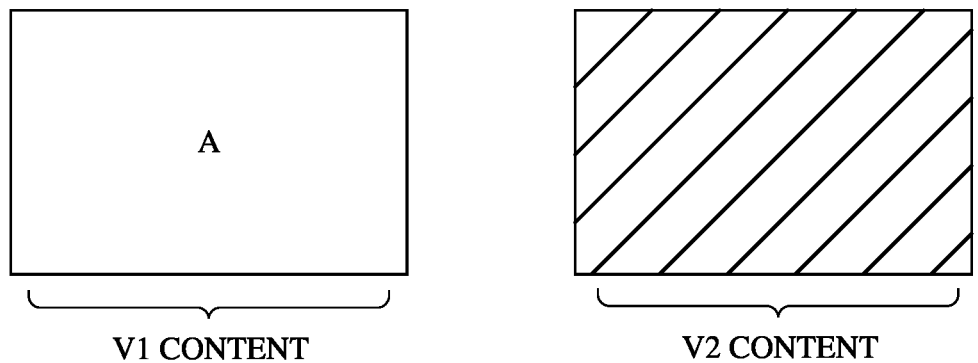
FIG. 5B is a top view showing how a display with a time-sequential directional backlight may present content in a first viewing area and a blank screen in a second viewing area in accordance with an embodiment.

Instead of presenting different content to different viewers, the time-sequential directional backlight may be used to provide privacy to the first viewer. FIG. 5B is a view of the content that may be presented to the first viewer and the second viewer. As shown, the first viewer may be presented with first content (e.g., content A) while the second viewer is presented with a blank screen (e.g., a totally black screen). To present the second viewer with the blank screen, both sets of backlights may be turned off. This causes the screen to appear black (blank) to the second viewer while the first viewer is presented with content.

Figure 6:
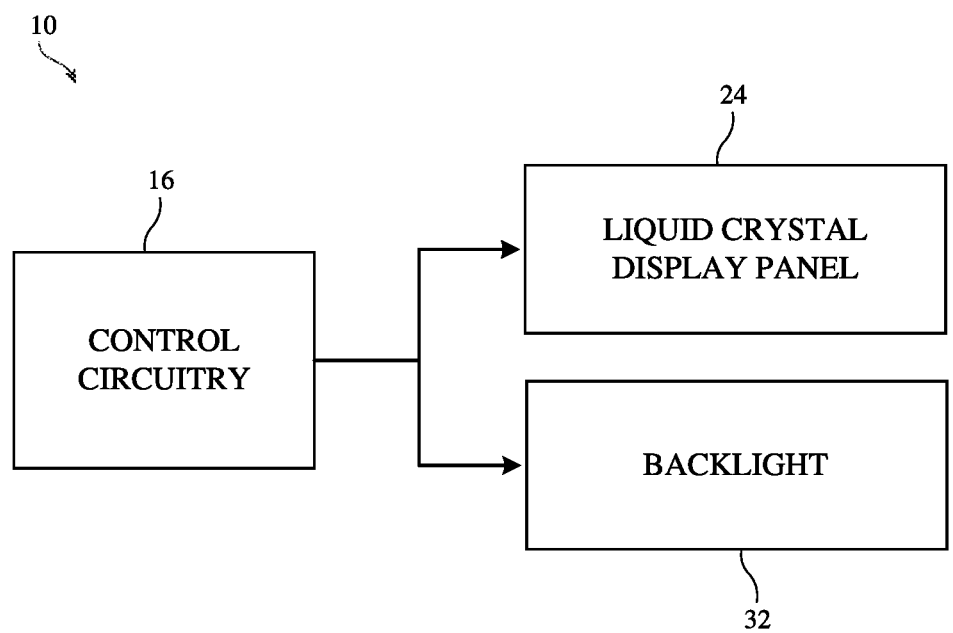
FIG. 6 is a schematic diagram of an electronic device with a time-sequential directional backlight in accordance with an embodiment.

Control circuitry 16 within electronic device 10 may synchronize operation of the liquid crystal display panel 24 and backlight 32. FIG. 6 is a schematic diagram of the electronic device showing show control circuitry 16 may control both liquid crystal display panel 24 and backlight 32. The control circuitry may ensure (e.g., using clock signals or other desired control signals) that liquid crystal display panel 24 switches between displaying first content and second content (e.g., at $t_1$ in FIG. 4) at the same time as the backlight unit switches between emitting backlight in the first direction and emitting backlight in the second direction (e.g., at $t_1$ in FIG. 4).

Figure 7:
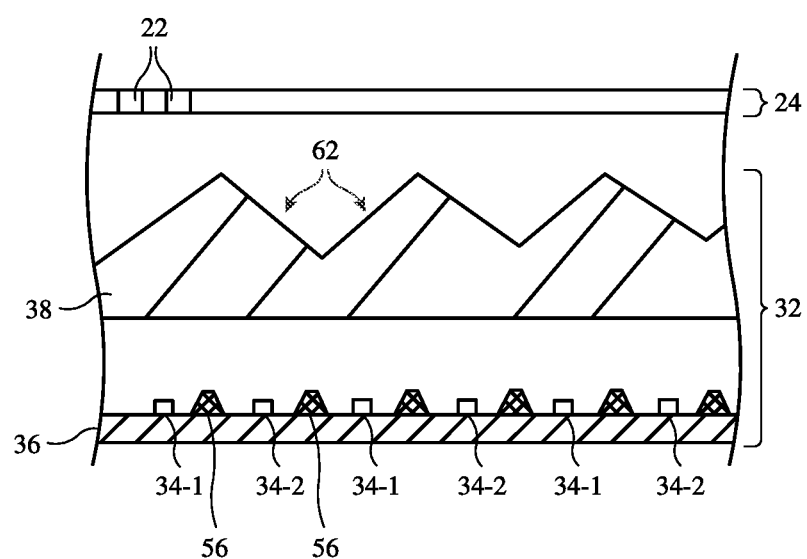
FIG. 7 is a cross-sectional side view of an illustrative display with a time-sequential directional backlight that includes prisms in accordance with an embodiment.

The arrangement of the time-sequential directional backlight in FIG. 2 is merely illustrative. If desired, a different light directing layer may be used instead of the lenticular lens layer in FIG. 2. FIG. 7 is a cross-sectional side view of an illustrative display with a time-sequential directional backlight that includes prisms. As shown, light directing layer 38 includes prisms 62. Each one of the light sources 34-1 is positioned under the left half of a respective prism 62. Each one of the light sources 34-2 is positioned under the right half of a respective prism 62.

Other light directing layers may be used instead of a lenticular lens layer or prism layer. For example, light directing layer 38 may instead be a Fresnel lens, a circular lens, a barrier pinhole layer, or any other desired structure that tunes the direction of incident light.

The example of FIGS. 2 and 7 where two groups of light sources are included in the backlight unit is merely illustrative. If desired, there may be three groups of light sources, four groups of light sources, or more than four groups of light sources. Each group of light sources may be configured to emit backlight in a unique direction (e.g., to a unique viewing area). Therefore, liquid crystal display panel 24 may be used to display different content to a number of viewers that is equal to the number of backlight light source groups. In other words, if there are three groups of light sources in the backlight unit that emit light in three unique directions, the liquid crystal display panel may display three different images (one for each of the three viewing directions). If there are four groups of light sources in the backlight unit that emit light in four unique directions, the liquid crystal display panel may display four different images (one for each of the four viewing directions).

Figure 8:
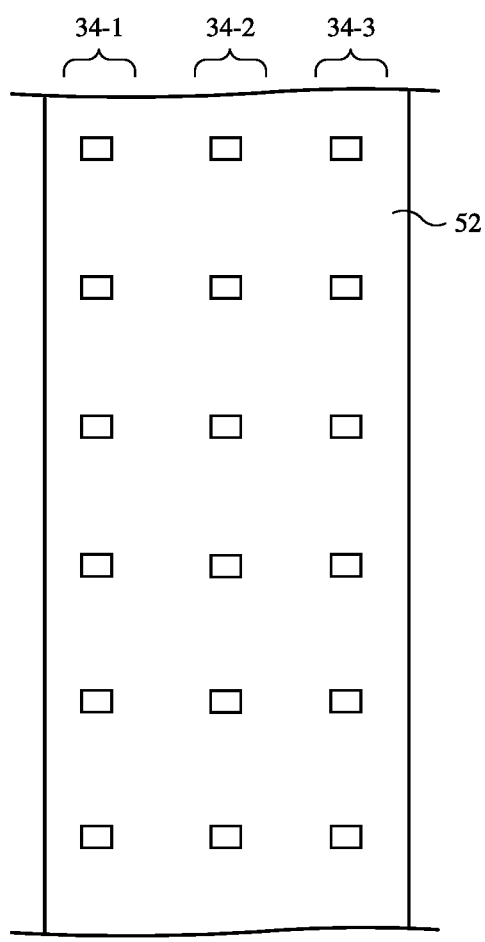
FIG. 8 is a top view of an illustrative lenticular lens in a time-sequential directional backlight showing how three groups of light sources are arranged relative to the lenticular lens in accordance with an embodiment.

FIG. 8 is a top view of an illustrative display showing how three sets of light sources may be positioned under respective portions of the lenticular lenses 52 in light directing layer 38. Each lenticular lens extends in the Y-direction across the backlight unit. Each lenticular lens covers first, second, and third sets of light sources that are arranged in strips that are parallel to the lenticular lens. The first set 34-1 is under a first half of the lenticular lens (e.g., on the left side in FIG. 8), the second set 34-2 is under the middle of the lenticular lens, and the third set 34-3 is under a second half of the lenticular lens (e.g., on the right side in FIG. 8). Each set 34-1 of light sources is in the same relative position under each lenticular lens (e.g., under the left half of each lenticular lens when viewed from above as in FIG. 8). Each set 34-2 of light sources is in the same relative position under each lenticular lens (e.g., under the middle of each lenticular lens when viewed from above as in FIG. 8). Each set 34-3 of light sources is in the same relative position under each lenticular lens (e.g., under the right half of each lenticular lens when viewed from above as in FIG. 8). This causes light from all of light sources 34-1 to be directed in the same direction (e.g., towards a first viewer), causes light from all of light sources 34-2 to be directed in the same direction (e.g., towards a second viewer), and causes light from all of light sources 34-3 to be directed in the same direction (e.g., towards a third viewer).

The field-of-view for each group of light sources may be equal or may be different. For example, consider the example where two groups of light sources are included in the backlight unit. The light sources may be arranged such that each light source group has an associated viewing angle. For example, the first light source group may have a viewing angle of between −5 degrees (relative to the surface normal of the display) and −60 degrees while the second light source group may have a viewing angle of between 5 degrees and 60 degrees. In this example, the viewing angle for each light source group is the same magnitude (55 degrees) and the fields-of-view are symmetric about the surface normal of the display. Alternatively, in a second example, the first light source group may have a viewing angle of between 30 degrees and −60 degrees while the second light source group may have a viewing angle of between 40 degrees and 60 degrees. In this example, the viewing angle for the first light source group (90 degrees) is greater than the viewing angle for the second light source group (20 degrees). Additionally, the fields-of-view are asymmetric about the surface normal of the display. In general, each group of light sources may direct light across a field-of-view of any desired magnitude and centered about any desired viewing angle.

The difference in direction of light emitted by the different groups of light sources may be any desired magnitude. For example, the direction (chief ray angle) of light emitted by a first group of light sources may be −30 degrees whereas the direction (chief ray angle) of light emitted by a second group of light sources may be 30 degrees. The difference in the directions in this example is 60 degrees. The difference between directions may be greater than 10 degrees, greater than 30 degrees, greater than 50 degrees, greater than 70 degrees, greater than 90 degrees, greater than 120 degrees, less than 120 degrees, between 30 degrees and 120 degrees, etc.

Figure 9:
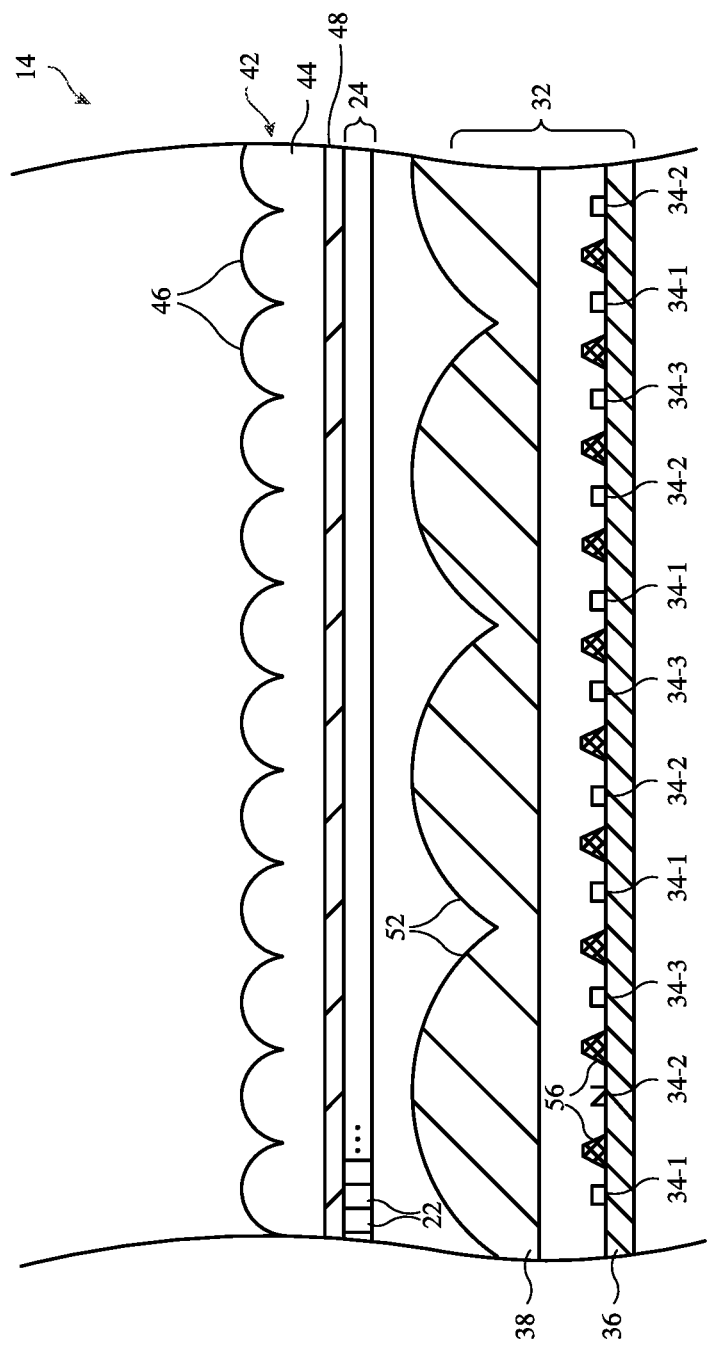
FIG. 9 is a cross-sectional side view of an illustrative stereoscopic display with a time-sequential directional backlight that emits backlight in three different directions in accordance with an embodiment.

FIG. 9 is a cross-sectional side view of a display with a time-sequential directional backlight that includes three different sets of light sources. Similar to as shown in FIG. 8, there are first, second, and third groups of light sources 34-1, 34-2, and 34-3 under each lenticular lens 52 in light directing layer 38. These groups of light sources may be used (in combination with display panel 24) to provide three different images to three different viewers of the display.

FIG. 9 also shows how a lenticular lens film 42 (sometimes referred to as stereoscopic lens film 42, light redirecting film 42, or lens film 42) may be formed over the display pixels 22 of display panel 24. Lenticular lens film 42 includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc. Lenticular lens film 42 may be attached to an upper surface of display panel 24 using optically clear adhesive (OCA) 48, as an example.

The lenticular lenses 46 may redirect light from the display pixels to enable stereoscopic viewing of the display. Some of the pixels in the display panel may be used to display a slightly different image than other pixels in the display. In other words, a first image is displayed for a first eye of the first viewer and a second, slightly different image is displayed for a second eye of the first viewer. Consequently, the first viewer may perceive the received images as a single three-dimensional image.

With the time-sequential directional backlight 32 and lenticular lens film 42, display 14 may present different three-dimensional images to different viewers. For example, in FIG. 9 (where there are three groups of light sources), the display may display first three-dimensional content to a first viewer, second three-dimensional content to a second viewer, and third three-dimensional content to a third viewer.

The example in FIG. 9 of lenticular lens film 42 being used to provide three-dimensional content is merely illustrative. Alternatively, another stereoscopic film may be used such as a circular lens film, a grating, or a barrier pinhole layer. Any layer may be used that splits the images from display 24 into multiple views for three-dimensional viewing.

As shown in FIG. 9, the pitch (center-to-center spacing) of lenticular lenses 46 (sometimes referred to as light directing structures 46) may be smaller than the pitch of lenticular lenses 52 (sometimes referred to as light directing structures 52). The pitch of structures 46 may be less than 90% of the pitch of structures 52, less than 75% of the pitch of structures 52, less than 50% of the pitch of structures 52, less than 30% of the pitch of structures 52, less than 20% of the pitch of structures 52, less than 10% of the pitch of structures 52, less than 5% of the pitch of structures 52, less than 1% of the pitch of structures 52, etc.

There may be an air gap between light directing layer 38 and display panel 24. Alternatively, a low-index filler material may be formed in the gap between the light directing layer 38 and display panel 24. The low-index filler material may conform to the upper surface of light directing layer 38 and the lower surface of display panel 24. The low-index filler may be transparent and may have an index of refraction that is less than 1.4, less than 1.3, less than 1.2, etc.

There may be an air gap between light directing layer 38 and light sources 34. Alternatively, a low-index filler material may be formed in the gap between the light directing layer 38 and light sources 34. The low-index filler material may conform to the upper surface of light sources 34, light guiding structures 56, and substrate 36. The low-index filler material may conform to the lower surface of light directing layer 38. The low-index filler may be transparent and may have an index of refraction that is less than 1.4, less than 1.3, less than 1.2, etc.

Figure 10:
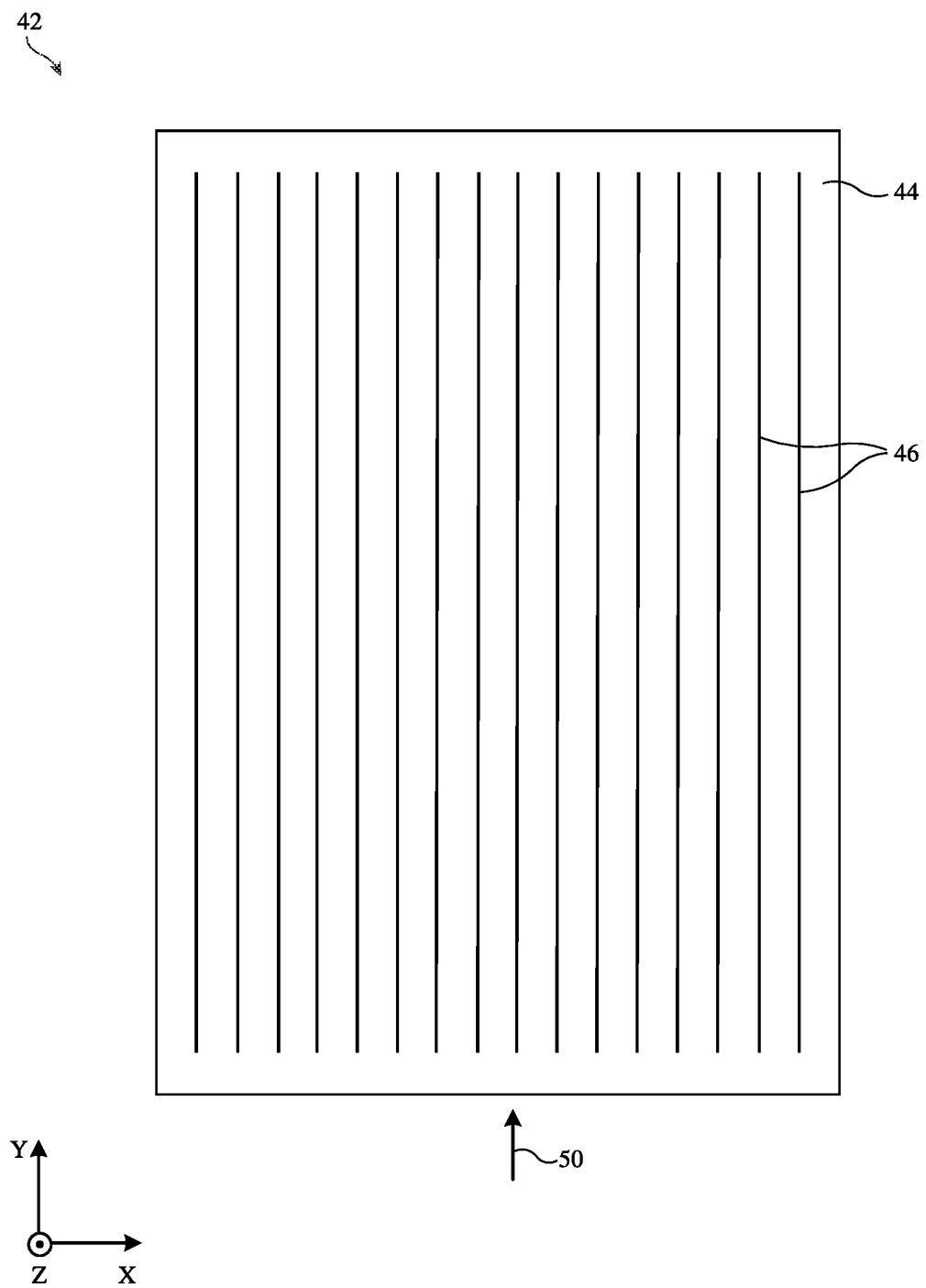
FIG. 10 is a top view of an illustrative lenticular lens film showing the elongated shape of the lenticular lenses in accordance with an embodiment.

FIG. 10 is a top view of an illustrative lenticular lens film that may be incorporated into a display such as the display of FIG. 9. As shown in FIG. 10, lenticular lens film 42 includes elongated lenses 46 that extend across the display parallel to the Y-axis. For example, the cross-sectional side view of FIG. 9 may be taken looking in direction 50. The lenticular display may include any desired number of lenticular lenses 46 (e.g., more than 10, more than 100, more than 1,000, more than 10,000, etc.). In FIG. 10, the lenticular lenses extend perpendicular to the upper and lower edge of the display panel. This arrangement is merely illustrative, and the lenticular lenses may instead extend at a non-zero, non-perpendicular angle (e.g., diagonally) relative to the display panel if desired. With the arrangement of FIG. 10, the lenticular lenses split the display into distinct viewing zones along the X-axis.

The X-axis may be considered the horizontal axis for the display whereas the Y-axis may be considered the vertical axis for the display. The left and right eye of a given user may have the same vertical position but different horizontal positions when viewing the display. Accordingly, lenticular lenses in FIG. 10 split the display into viewing zones along the X-axis such that each eye may view a different image from the display.

If desired, a two-dimensional array of spherical lenses may be used in place of lenticular lens film 42. The spherical lenses (sometimes referred to as microlenses) may enable three-dimensional viewing with full parallax (e.g., by splitting the display into viewing zones along both the X-axis and the Y-axis), as opposed to the lenticular lenses that enable only horizontal parallax.

Figure 11:
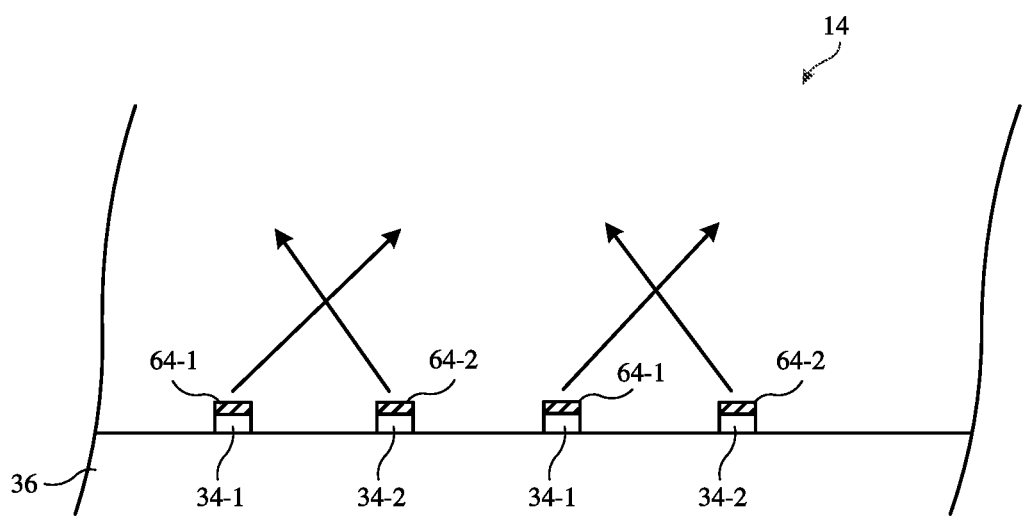
FIG. 11 is a cross-sectional side view of an illustrative display with light sources that include integral light directing structures that direct light away from the surface normal in accordance with an embodiment.

If desired, light sources 34 may include lenses, gratings, and/or distributed Bragg reflectors (DBRs) that direct the backlight from the light sources in a particular direction. FIG. 11 is a cross-sectional side view of a display where the light sources in the time-sequential backlight unit have integrated light directing structures. The first group of light sources (e.g., light sources 34-1) each have an integral light directing structure 64-1 that directs the light in a first direction (e.g., towards a first viewer). The second group of light sources (e.g., light sources 34-2) each have an integral light directing structure 64-2 that directs the light in a second direction (e.g., towards a second viewer). The light directing structures 64-1 and 64-2 may be incorporated into the packaging of light sources (LEDs) 34.

With the presence of light directing structures 64-1, light sources 34-1 emit light with a maximum brightness in a direction that is not parallel to the surface normal of the display (or an upper surface of substrate 36). With the presence of light directing structures 64-2, light sources 34-2 emit light with a maximum brightness in a direction that is not parallel to the surface normal of the display (or an upper surface of substrate 36).

When light directing structures 64-1 and 64-2 (e.g., distributed Bragg reflectors) are incorporated into the light sources, the light directing film 38 may optionally be omitted from the display. Alternatively, the light directing film may collimate the light from light sources 34 without substantially changing the primary direction (e.g., chief ray angle) of the emitted light.

The aforementioned techniques may be used in any combination to provide different content (either two-dimensional content as in FIG. 2 or three-dimensional content as in FIG. 9) to different viewers. Using the time-sequential directional backlight described herein to display different content to different viewers may improve viewing angle, mitigate visible artifacts, improve contrast, and/or improve efficiency of the display relative to embodiments where a time-sequential directional backlight is not used.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

The invention claimed is:

1. A display comprising:
a liquid crystal display panel; and
a backlight unit that provides backlight for the liquid crystal display panel, wherein the backlight unit is configured to repeatedly switch between a first state and a second state, wherein the backlight unit emits light at a first maximum brightness in a first direction in the first state, wherein the backlight unit emits light at a second maximum brightness in a second direction in the second state, wherein the first direction is different than the second direction, and wherein the backlight unit comprises:
a substrate;
light sources on the substrate;
a lenticular lens film that is interposed between the light sources and the liquid crystal display panel, wherein the lenticular lens film is configured to redirect light from a first subset of the light sources in the first direction, wherein the lenticular lens film is configured to redirect light from a second subset of the light sources in the second direction, wherein the lenticular lens film comprises a plurality of lenticular lenses, wherein each light source in the first subset is positioned under a left half of a respective lenticular lens, and wherein each light source in the second subset is positioned under a right half of a respective lenticular lens; and
reflective structures on the substrate, wherein, under each lenticular lens of the lenticular lens film, at least one of the reflective structures is interposed between at least one light source in the first subset and at least one light source in the second subset.

2. The display defined in claim 1, wherein a difference between the first direction and the second direction is greater than thirty degrees.

3. The display defined in claim 1, wherein the liquid crystal display panel is configured to display first content while the backlight unit is in the first state and wherein the liquid crystal display panel is configured to display second content while the backlight unit is in the first state.

4. The display defined in claim 3, wherein the liquid crystal display panel is configured to repeatedly switch between displaying the first content and the second content.

5. The display defined in claim 4, wherein the liquid crystal display panel is configured to repeatedly switch between displaying the first content and the second content in synchronization with the backlight unit repeatedly switching between the first state and the second state.

6. The display defined in claim 1, wherein, while the backlight unit is in the first state, the first subset of light sources is on, and the second subset of light sources is off.

7. The display defined in claim 6, wherein, while the backlight unit is in the second state, the second subset of light sources is on, and the first subset of light sources is off.

8. The display defined in claim 6, wherein each light source in the first subset of light sources comprises an integral first light directing structure, wherein each light source in the second subset of light sources comprises an integral second light directing structure, and wherein the first and second light directing structures direct light in different directions.

9. The display defined in claim 8, wherein the first and second light directing structures are first and second distributed Bragg reflectors.

10. The display defined in claim 1, wherein the backlight unit is configured to repeatedly switch between the first state and the second state at a regular interval and wherein the interval is less than 40 milliseconds.

11. The display defined in claim 1, further comprising:
a lenticular lens layer, wherein the liquid crystal display panel is interposed between the lenticular lens layer and the lenticular lens film.

12. The display defined in claim 1, wherein each reflective structure has first and second angled sidewalls.

13. The display defined in claim 1, wherein each reflective structure has a reflectivity that is greater than 50%.

14. A display comprising:
a display panel; and
a backlight unit that provides backlight for the display panel, wherein the backlight unit is configured to repeatedly switch between a first state and a second state and wherein the backlight unit comprises:
a substrate;

a first group of light-emitting diodes on the substrate, wherein each light-emitting diode in the first group of light-emitting diodes has a respective package and a respective first light directing structure that is incorporated into that package; and a second group of light-emitting diodes on the substrate, wherein each light-emitting diode in the second group of light-emitting diodes has a respective package and a respective second light directing structure that is incorporated into that package, wherein, while the backlight unit is in the first state, the first group of light sources is on, and the second group of light sources is off, wherein, while the backlight unit is in the second state, the second group of light sources is on, and the first group of light sources is off, wherein the first light directing structures direct light in a first direction, and wherein the second light directing structures direct light in a second direction that is different than the first direction.

15. The display defined in claim 14, wherein the backlight unit further comprises:

a light directing layer that is interposed between the substrate and the display panel.

16. The display defined in claim 14, wherein the first light directing structures are first distributed Bragg reflectors and wherein the second light directing structures are second distributed Bragg reflectors.

17. A display comprising:

a liquid crystal display panel; and a backlight unit that provides backlight for the liquid crystal display panel, wherein the backlight unit is configured to repeatedly switch between a first state and a second state, wherein the backlight unit emits light at a first maximum brightness in a first direction in the first state, wherein the backlight unit emits light at a second maximum brightness in a second direction in the second state, wherein the first direction is different than the second direction, and wherein the backlight unit comprises:

a substrate;

light sources on the substrate;

a prism film that is interposed between the light sources and the liquid crystal display panel, wherein the prism film is configured to redirect light from a first subset of the light sources in the first direction, wherein the prism film is configured to redirect light from a second subset of the light sources in the second direction, wherein the prism film comprises a plurality of prisms, wherein each light source in the first subset is positioned under a left half of a respective prism, and wherein each light source in the second subset is positioned under a right half of a respective prism; and reflective structures on the substrate, wherein, under each prism of the prism film, at least one of the reflective structures is interposed between at least one light source in the first subset and at least one light source in the second subset.

18. The display defined in claim 17, wherein each reflective structure has first and second angled sidewalls.

19. The display defined in claim 17, wherein each reflective structure has a reflectivity that is greater than 50%.

* * * * *